United States Patent
Nakamura et al.

(10) Patent No.: US 12,259,776 B2
(45) Date of Patent: Mar. 25, 2025

(54) MAINTENANCE METHOD FOR ENERGY STORAGE SYSTEM AND COMPUTER PROGRAM

(71) Applicant: GS Yuasa International Ltd., Kyoto (JP)

(72) Inventors: Shogo Nakamura, Kyoto (JP); Shintaro Gamo, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 180 days.

(21) Appl. No.: 17/604,885

(22) PCT Filed: Apr. 24, 2019

(86) PCT No.: PCT/JP2019/017319
§ 371 (c)(1),
(2) Date: Oct. 19, 2021

(87) PCT Pub. No.: WO2020/217328
PCT Pub. Date: Oct. 29, 2020

(65) Prior Publication Data
US 2022/0236786 A1     Jul. 28, 2022

(51) Int. Cl.
*G06F 1/32*      (2019.01)
*G06F 1/3212*      (2019.01)
*G06F 1/3296*      (2019.01)
*H01M 10/48*      (2006.01)

(52) U.S. Cl.
CPC .......... *G06F 1/3296* (2013.01); *G06F 1/3212* (2013.01); *H01M 10/48* (2013.01)

(58) Field of Classification Search
CPC ..... G06F 1/32; G06F 9/44; G06F 1/12; G06F 1/28
See application file for complete search history.

(56) References Cited

U.S. PATENT DOCUMENTS

| | | | | |
|---|---|---|---|---|
| 4,881,026 A | * | 11/1989 | Ishida | H01M 10/48 324/522 |
| 10,283,987 B1 | * | 5/2019 | Wang | H02J 7/00714 |
| 11,536,774 B2 | * | 12/2022 | Nakai | G06Q 50/06 |
| 2015/0069973 A1 | | 3/2015 | Yoshida | |

(Continued)

FOREIGN PATENT DOCUMENTS

| | | |
|---|---|---|
| JP | 2003-123847 A | 4/2003 |
| JP | 2013-118786 A | 6/2013 |

(Continued)

OTHER PUBLICATIONS

International Searching Authority, International Search Report and Written Opinion for International Application No. PCT/JP2019/017319, dated Jun. 18, 2019, (7 pages), Japan Patent Office, Tokyo, Japan.

*Primary Examiner* — Keshab R Pandey
(74) *Attorney, Agent, or Firm* — Alston & Bird LLP

(57) ABSTRACT

A maintenance method for a power storage system wherein: in a bank in which multiple modules, each comprising multiple lithium-ion battery cells connected to each other, are serially connected, a voltage sensor measures voltage values of the cells; a module containing a cell having the lowest voltage value in the hank is identified; and the capacity of the identified module or of the cell having the lowest voltage value is measured.

20 Claims, 12 Drawing Sheets

(56) References Cited

U.S. PATENT DOCUMENTS

| | | |
|---|---|---|
| 2016/0356856 A1 | 12/2016 | Hongo |
| 2017/0310130 A1 | 10/2017 | Yoshida |
| 2018/0241097 A1 | 8/2018 | Yamasaki et al. |
| 2022/0097566 A1* | 3/2022 | Tanaka ................ B60L 58/22 |

FOREIGN PATENT DOCUMENTS

| | | |
|---|---|---|
| JP | 2013-210257 A | 10/2013 |
| JP | 2015-118035 A | 6/2015 |
| WO | WO-2013/128810 A1 | 9/2013 |
| WO | WO-2015/072528 A1 | 5/2015 |
| WO | WO-2017/135069 | 8/2017 |

* cited by examiner

Fig. 5

| | | | | 330 332 |
|---|---|---|---|---|
| User ID : admin00 Authority: Administrator | | | | |

| | Identification information (number) | System name | State | Information analysis | |
|---|---|---|---|---|---|
| | | | | Statistical information | Life prediction |
| System search | | | | | |
| Life prediction | 12345 | XY-city mega solar system | Normal | | |
| Download | | | | | |
| Report | 34567 | WZ power plant system | Normal | | |
| | 56789 | K railway system | Normal | | |
| Register | | | | | |
| Edit | 78912 | X factory UPS | Abnormal | | |
| | 65498 | W factory energy storage system | Normal | | |

List

331

MAINTENANCE METHOD FOR ENERGY STORAGE SYSTEM AND COMPUTER PROGRAM

CROSS REFERENCE TO RELATED APPLICATIONS

This application is a national stage application, filed under 35 U.S.C. § 371, of International Application No. PCT/JP2019/017319, filed Apr. 24, 2019, the contents of which as are hereby incorporated by reference in their entirety.

BACKGROUND

Technical Field

One aspect of the present invention relates to a maintenance method for an energy storage system and a computer program.

Description of Related Art

An energy storage device is widely used in an uninterruptible power system, a d.c. or a.c. power supply included in a stabilized power supply, and the like. In addition, the use of energy storage devices in large-scale systems that store renewable energy or electric power generated in existing power generating systems is expanding.

In the uninterruptible power system, the stabilized power supply, or a power generating system, maintenance activities of the energy storage device are important. Conventionally, in order to grasp the stage of health (SOH) of an energy storage device, some energy storage devices are removed from a system (e.g., energy storage system (ESS)), which is mounted or connected with a large number of energy storage devices, and are delivered to an energy storage device manufacturer, and a capacity measurement (capacity checking) is performed. After the energy storage device is charged into a fully charged state, the energy storage device is completely discharged at a predetermined discharge rate (e.g., 1 C rate) by using a measuring load, so that the capacity of the energy storage device can be measured correctly.

Alternatively, there is a case where the capacity of the energy storage device is simply estimated at a place where the energy storage device is installed without detaching the energy storage device from the system. There are various methods, but typically, the energy storage device is charged or discharged (e.g., discharged with a SOC from 80% to 50%) at a rate lower than a discharge rate at the time of the capacity measurement by the complete discharge described above (at the time of discharge with a SOC from 100% to 0%) by using the actual load of the system. In order to confirm the consistency between the energy storage device capacity estimated by this simple method and the actual capacity of the energy storage device, a maintenance person goes to the installation place of the energy storage device and extracts one to several energy storage devices from the system to precisely measure the capacity.

JP-A-2003-123847 discloses a maintenance management method for a storage battery configured by connecting a plurality of unit storage batteries in series.

BRIEF SUMMARY

A large number of energy storage devices are installed in the ESS. For example, in a large system using a lithium ion battery, a plurality of modules, in each of which a plurality of (e.g., 8 to 16) cells are connected in series, are connected in series to form one circuit (bank or string), and a plurality of banks are connected in parallel to form the entire ESS. In such a large system, it is practically difficult to measure the capacities of all the cells and all the modules.

For example, 100 energy storage modules are mounted (800 to 1600 cells are mounted) on a container used for cargo transportation to constitute the ESS. For a normal inspection of the ESS (an inspection in a state where no system abnormality is detected), some maintenance person may randomly select a module from a plurality of banks (e.g., select one module) and measure the capacity of the module.

Large systems using lithium ion batteries have not been in operation for a long time, and a standard periodic inspection method has not been established.

An object of one aspect of the present invention is to provide an efficient maintenance method for an energy storage system and a computer program.

A maintenance method for an energy storage system according to one aspect of the present invention includes: measuring, by a voltage sensor, a voltage value of each of a plurality of lithium ion battery cells in an energy storage system including a bank in which a plurality of modules, each formed by connecting the plurality of lithium ion battery cells, are connected in series; identifying a module that includes a cell with the lowest voltage value in the bank; and performing a capacity measurement on the identified module or the cell with the lowest voltage value.

The charge-discharge performance of a bank is limited by an energy storage cell that is included in the bank and has the lowest capacity (full-charge capacity).

In many cases (in the case of having a positive active material containing three components of nickel, cobalt, and manganese), the capacity of a lithium ion battery cell is correlated with the voltage of the cell. The present inventors have focused on a bank in an ESS during an inspection in normal time and conceived that the capacity measurement should be performed on a cell with the lowest voltage value in the bank or a module including such a cell.

Similarly, when a module or a bank is made up of other energy storage cells (cells except for lithium ion battery cells) each having a capacity correlated with the cell voltage, it is possible to identify a module that includes a cell with the lowest voltage value in the bank and perform a capacity measurement.

In the ESS using the lithium ion battery, the voltage is measured by the voltage sensor at a relatively high frequency for all the cells, and hence the data amount of the obtained voltage is enormous. By focusing on a bank, identifying a module that includes a cell with the lowest voltage value in the bank, and measuring the capacity of the module or the capacity of the cell with the lowest voltage value, it is possible to realize efficient maintenance of the energy storage system.

The module including the cell with the lowest voltage value in the bank may be identified from the voltage value of each cell during charge or discharge (during cycling).

In a cell that has been degraded compared to other cells, the internal resistance has increased and the capacity has decreased compared to the other cells, and hence the fluctuation of the voltage tends to be large compared to the other cells during charge or discharge. By using the voltage data during discharge, it is easy to identify the module including the cell with the lowest voltage value in the bank.

On the other hand, at the time of non-energization (during a non-cycle), variation in voltage is leveled by a balancer function mounted in the module, and hence it tends to be more difficult to identify the module including the cell with the lowest voltage value in the bank than during a cycle.

It is preferable to identify the module including the cell with the lowest voltage value in the bank from history data (log data) of a voltage value stored in a storage unit provided in a management apparatus of the energy storage module/ bank, a storage unit provided in the communication device, or a storage unit provided in the information processing apparatus (server apparatus), which will be described later. This is because, when a value at a certain point of time (instantaneous value) of the measurement value of the voltage sensor is used, the measurement value may be affected by noise or the like, and correct determination may not be possible.

The module including the cell with the lowest voltage value in the bank may be identified from the voltage value of each cell in the state of charge (SOC) close to the complete discharge or the use lower limit.

In the vicinity of complete discharge, the degraded cell exhibits significantly different voltage behavior from the other cells. Hence it is easy to identify the module including the cell with the lowest voltage value in the bank.

A situation and application are assumed in which the frequency that the cell is discharged to the complete discharge voltage is low (or almost none). When the degraded cell exhibits a voltage behavior different from those of the other cells even near the use lower limit voltage set higher than the complete discharge voltage, the voltage value of each cell near the use lower limit voltage may be used. The "close to the use lower limit voltage" may be equal to or less than a voltage value corresponding to an absolute SOC of 30% based on an initial full-charge capacity of a new energy storage cell at normal temperature, and more preferably equal to or less than a voltage value corresponding to an absolute SOC of 25%.

A computer may be caused to communicably connect to a communication device provided in the energy storage system or an information processing apparatus acquiring information that includes a state of the energy storage system from the communication device by communication; and the computer may be caused to receive screen display information for the identification from the communication device or the information processing apparatus to identify a module that includes a cell with the lowest voltage value in the bank.

With such a configuration, the maintenance person can more reliably identify the cell or module to be subjected to the capacity measurement. The efficiency of the maintenance operation is improved significantly. Here, the "communication device provided in the energy storage system" may be a communication device individually provided in the bank or may be a communication device provided in a management apparatus that controls a plurality of banks.

A computer program according to another aspect of the present invention causes a computer including a display unit to receive and display information of an energy storage system including a bank in which a plurality of modules, each formed by connecting a plurality of energy storage cells, are connected in series. A computer program causes the computer to execute the steps of: requesting communication connection to a communication device provided in the energy storage system or an information processing apparatus acquiring information that includes a state of the energy storage system from the communication device by communication; and displaying information for identifying a module that includes a cell with the lowest voltage value in the bank on the basis of screen display information transmitted in response to the request.

BRIEF DESCRIPTION OF THE FIGURES

FIG. 5 is a diagram illustrating a screen example displayed after login.

DETAILED DESCRIPTION OF VARIOUS EMBODIMENTS

The present invention will be described in detail with reference to the accompanying drawings illustrating the embodiment. The present invention is not limited to the following embodiments.

First Embodiment

Figure 1:
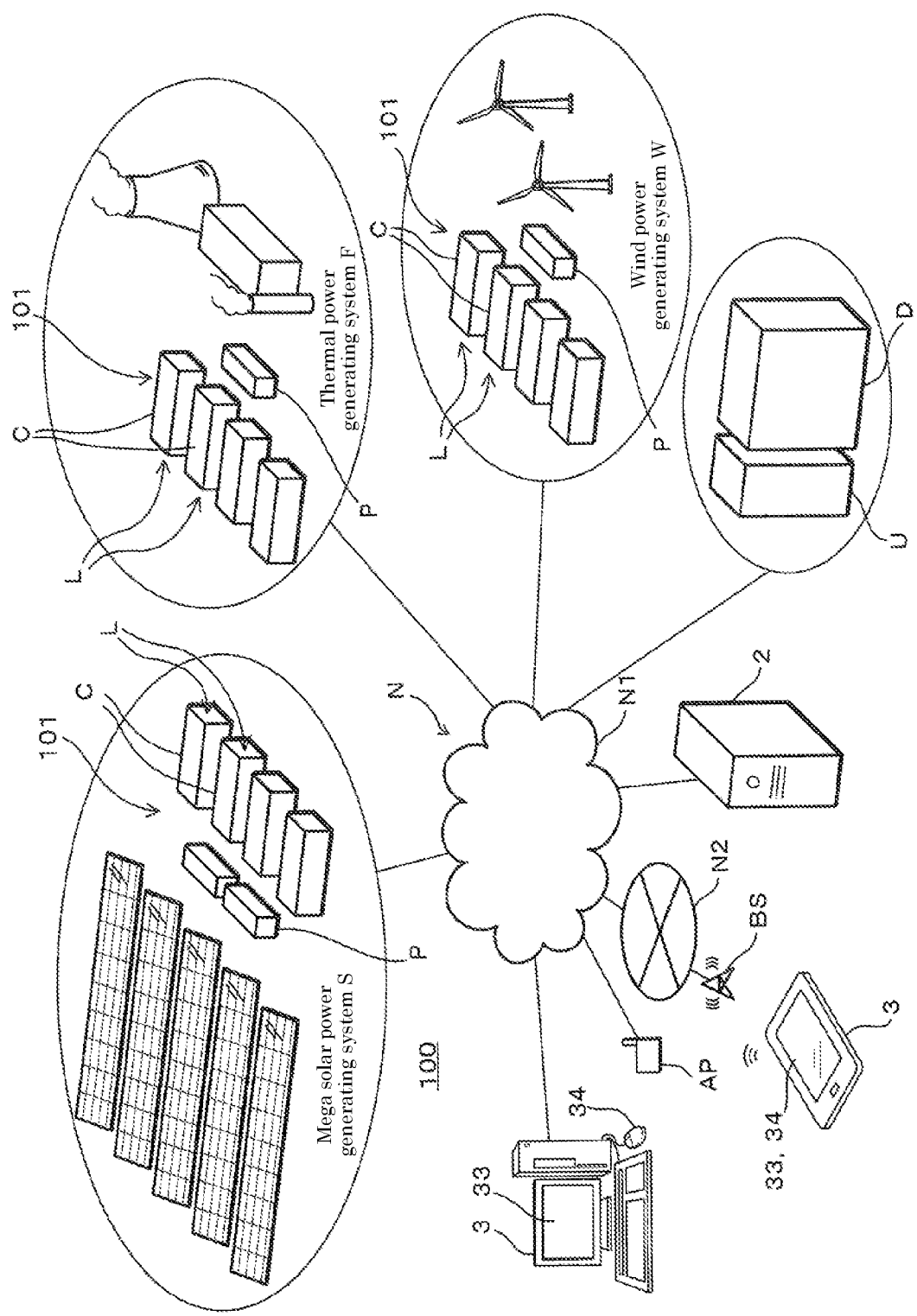
FIG. 1 is a diagram illustrating an outline of a remote monitoring system.
Figure 2:
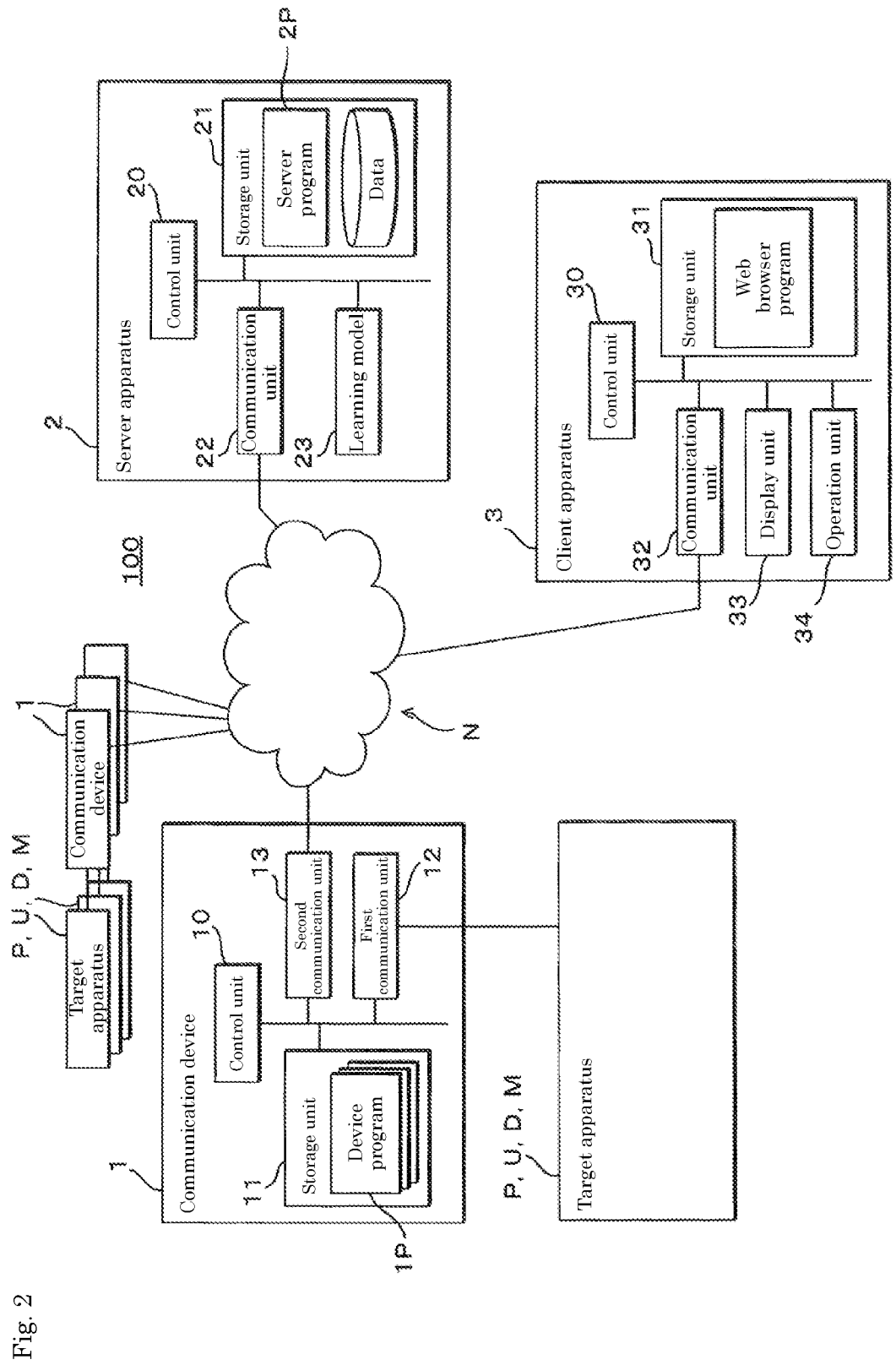
FIG. 2 is a block diagram illustrating a configuration of the remote monitoring system.

FIGS. 1 and 2 are diagrams illustrating an outline of a remote monitoring system 100. The remote monitoring system 100 includes a communication device 1 (c.f. FIG. 2) mounted in/connected to each of systems or apparatuses to be monitored, a server apparatus 2 (information processing apparatus) that collects information from the communication device 1, and a client apparatus 3 that acquires the collected information. The server apparatus 2 includes a web server function and presents information obtained by the communication device 1 mounted in/connected to each apparatus in accordance with access from the client apparatus 3.

Figure 3:
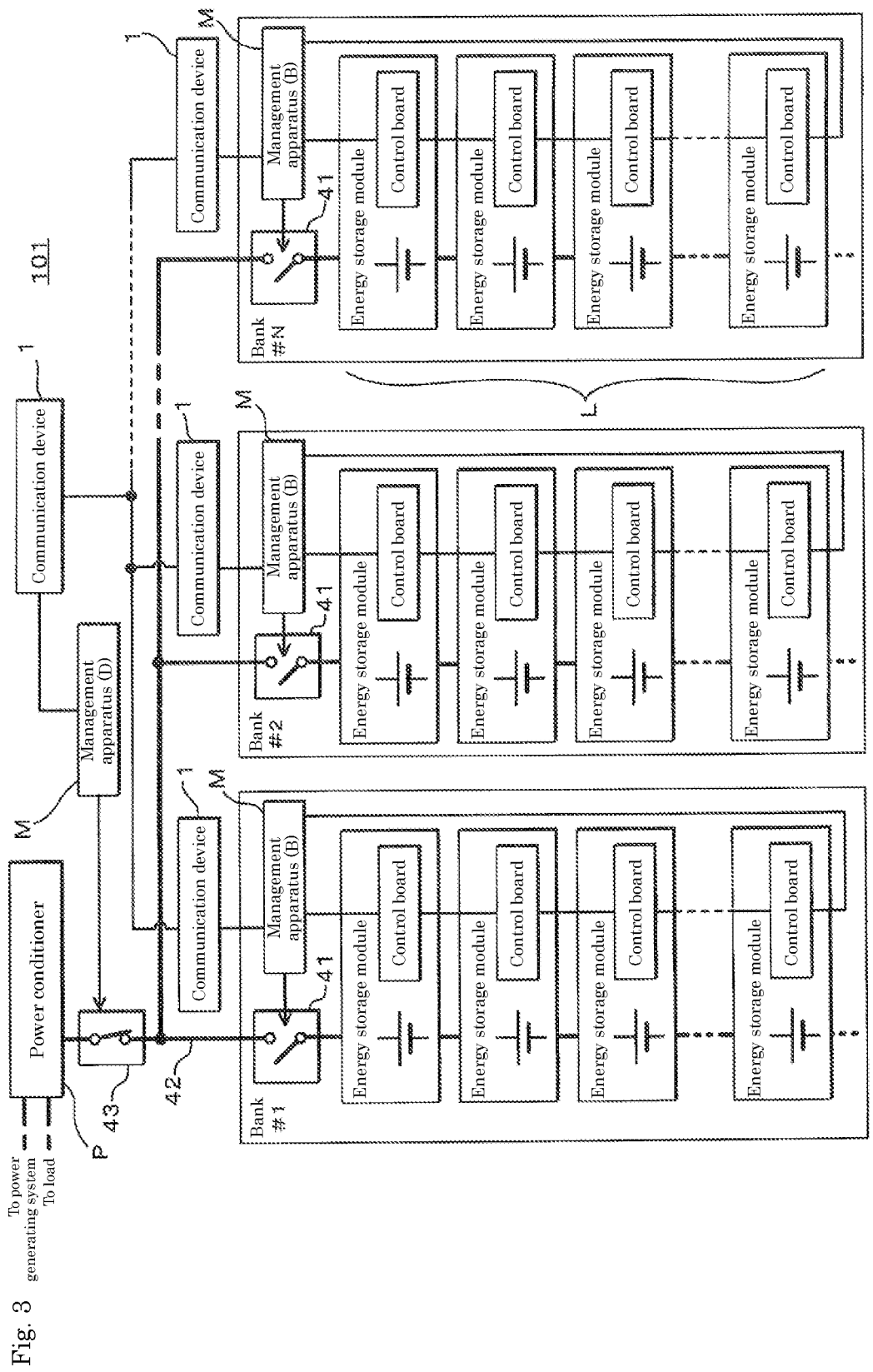
FIG. 3 is a diagram illustrating an example of a hierarchical structure of an energy storage module group and a connection form of a communication device.

As illustrated in FIG. 1, the communication device 1 is mounted in an energy storage system 101 provided side by side with each of a mega solar power generating system S, a thermal power generating system F, and a wind power generating system W. Specifically, the communication device 1 is mounted in/connected to each of a power conditioner (PCS) P and an energy storage module group L. The energy storage module group L has, for example, a hierarchical structure of a bank in which a plurality of energy storage modules, each including a plurality of lithium ion battery cells, are connected in series and a domain in which a plurality of banks are connected in parallel. A management apparatus M (c.f. FIG. 3) is provided for each bank and domain. As illustrated in FIG. 1, the energy storage system 101 is configured by juxtaposing a plurality of containers C that house the energy storage module groups L.

The communication device 1 is also mounted in apparatuses such as an uninterruptible power system (UPS) U and a rectifier (d.c. power supply or a.c. power supply) D disposed in a stabilized power system for a railway.

In the monitoring system 100, the communication device 1 is mounted in/connected to each power supply related apparatus in order for the server apparatus 2 to collect information or for the client apparatus 3 to acquire information. The communication device 1 may be a terminal apparatus (measurement monitor) that communicates with a battery management unit (BMU) provided in the energy storage device to receive information of the energy storage device or may be a network card type device.

The communication device 1 illustrated in FIG. 2 includes a control unit 10, a storage unit 11, a first communication unit 12, and a second communication unit 13. The control unit 10 is a processor using a central processing unit (CPU) and uses built-in memories such as read only memory (ROM) and random access memory (RAM) to control each component and execute processing.

The storage unit 11 uses a nonvolatile memory such as a flash memory. The storage unit 11 stores a device program 1P to be read and executed by the control unit 10. The device program 1P includes an embedded operating system (OS) using Linux (registered trademark) or the like, a web server running on the OS, and a communication program based on Secure Shell (SSH), Simple Network Management Protocol (SNMP), or the like. The device program 1P may include a mailer program, and when an abnormality occurs, an electronic mail may be automatically transmitted to a preset mail address. These programs may be stored in a memory (ROM) built in the control unit 10. The storage unit 11 stores information such as information collected by the processing of the control unit 10 and event logs. The information stored in the storage unit 11 can also be read via a communication interface, such as a universal serial bus (USB) having a terminal exposed to a casing of the communication device 1.

The first communication unit 12 is a communication interface that realizes communication with an apparatus (an apparatus to be monitored) mounted with the communication device 1 and uses, for example, a serial communication interface such as RS-232 C or RS-485. For example, each energy storage module included in the energy storage module group L may incorporate a control board having a communication function conforming to RS-232 C, and the first communication unit 12 may communicate with a plurality of energy storage modules.

The second communication unit 13 is an interface for realizing communication via the network N and uses, for example, a communication interface such as an Ethernet (registered trademark) or a wireless communication antenna. The control unit 10 can be communicably connected to the server apparatus 2 via the second communication unit 13.

In the communication device 1 configured as described above, the control unit 10 acquires, via the first communication unit 12, information obtained in an apparatus mounted or connected with the communication device 1. By reading and executing a web server program, the control unit 10 can also receive connection from the server apparatus 2 or the client apparatus 3 as a web server and present information. The control unit 10 can remotely receive a shutdown function by SSH. By reading and executing an SNMP program, the control unit 10 can also function as an SNMP agent and respond to an information request from the server apparatus 2.

FIG. 3 is a block diagram illustrating a configuration example of the energy storage system 101. The energy storage module group L may have a hierarchical structure of, for example, an energy storage module (also referred to as module) in which a plurality of energy storage cells (also referred to as cells) are connected in series, a bank in which a plurality of energy storage modules are connected in series, and a domain in which a plurality of banks are connected in parallel. FIG. 3 illustrates only one domain.

The energy storage system 101 includes the power conditioner P. The power conditioner P supplies electric power generated in a power generating system, such as a solar system, to the energy storage system 101 and supplies the electric power stored into the energy storage system 101 to other power consumption facilities (loads) or power systems. The power conditioner P is connected by a power line 42 to a plurality of banks #1 to #N in parallel. Between the branch point of the power line 42 to the plurality of banks and the power conditioner P, a switch 43 is provided. By opening and closing the switch 43, the on/off of energization from the power conditioner P to the entire domain is switched. The switch 43 may be provided inside the power conditioner P.

Each bank is provided with a switching unit 41. The switching unit 41 switches the on/off the energization to the energy storage module group L from the branch point of the power line 42 to a plurality of banks. The switching unit 41 switches between an on-state in which the power line 42 and the energy storage module group L are connected and an off-state in which the power line 42 and the energy storage module group L are not connected. In the state where the energy storage module group L of each bank and the power line 42 are connected, charge or discharge, that is, energization, is performed through the power conditioner P, the switch 43, the power line 42, and the switching unit 41. In FIG. 3, the switching unit 41 is provided for each bank, but a plurality of banks may be divided into groups, and one switching unit 41 may be provided for each group.

In the example of FIG. 3, a management apparatus (BMU) M is provided for each bank unit and each domain unit. In a case where the management apparatus M provided in the bank unit and the management apparatus M provided in the domain unit are separately explained, parentheses are attached to B for the bank and D for the domain for easy description. The management apparatus (B)M for the bank communicates with a control board (cell monitoring unit: CMU) with a communication function built inside the energy storage module by serial communication. The management apparatus M operates by receiving power supply from the power conditioner P or from the energy storage module group L, via the power line 42.

The management apparatus (B)M is connected to the switching unit 41, and the management apparatus (D)M is connected to the switch 43. The switching unit 41 and the switch 43 are each controlled by the management apparatus M.

The communication device 1 is connected to the energy storage module group L to be monitored via the management apparatus M. As described above, the communication device 1 is connected to the management apparatus M by the first communication unit 12 via a serial communication cable. The communication device 1 may be integrated with the management apparatus M. The communication device 1 operates by receiving power supply through a path different from the power line 42. The plurality of communication devices 1 are communicatively connected to each other so as to transmit and receive information. In the example illustrated in FIG. 3, the communication devices 1 are connected by a communication bus. The communication bus is, for example, a local area network (LAN) cable. Alternatively, the communication bus may be a control area network (CAN) bus or an ECHONETLite compatible communication medium. The management apparatus (D)M for the domain and the management apparatus (D)M for another domain in the same system are connected by a different communication bus, for example, a CAN bus, and may be able to communicate with each other. The management apparatus M can control each of the switching unit 41 and the switch 43 in accordance with an instruction from the communication device 1.

The server apparatus 2 illustrated in FIG. 2 uses a server computer and includes a control unit 20, a storage unit 21 and a communication unit 22. Although the server apparatus 2 will be described as one server computer in the present embodiment, processing may be distributed among a plurality of server computers.

The control unit 20 is a processor using a CPU and controls each component by using a built-in memory such as a ROM and a RAM to executes processing. The control unit 20 executes information processing based on a server program 2P stored in the storage unit 21. The server program 2P includes a web server program, and the control unit 20 functions as a web server that performs provision of a web page to the client apparatus 3, acceptance of a login to a web service, and the like. The control unit 20 collects information from the communication device 1 by http/https communication on the basis of the server program 2P.

The storage unit 21 uses a nonvolatile memory such as a hard disk or a flash memory. The storage unit 21 stores the server program 2P described above and also stores data including the states of the power conditioner P, the energy storage module group L, the uninterruptible power system U, and the rectifier D to be monitored, the states being collected by the processing of control unit 20.

The communication unit 22 is a communication device that realizes communication connection and data transmission/reception via the network N. Specifically, the communication unit 22 is communication equipment compatible with a dedicated line and a general optical line.

The client apparatus 3 is a computer used by an operator such as an administrator of the energy storage system 101 of the power generating systems S, F, and W, an administrator of the stabilized power system, or a maintenance person of the uninterruptible power system U. The client apparatus 3 may be a desktop or laptop personal computer or may be a so-called smartphone or tablet type communication terminal. The client apparatus 3 includes a control unit 30, a storage unit 31, a communication unit 32, a display unit 33, and an operation unit 34.

The control unit 30 is a processor using a CPU. The control unit 30 causes the display unit 33 to display a web page provided by the server apparatus 2 or the communication device 1 on the basis of a web browser program stored in the storage unit 31.

The storage unit 31 uses a nonvolatile memory such as a hard disk or a flash memory. The storage unit 31 stores various programs including a web browser program.

The communication unit 32 uses a communication device, such as a network card for wired communication, a wireless communication device for mobile communication connected to a base station BS (cf. FIG. 1), or a wireless communication device corresponding to connection to an access point AP. The control unit 30 can communicatively connect with, or transmit and receive information to and from, the server apparatus 2 or the communication device 1 via the network N by using the communication unit 32.

The display unit 33 uses a display such as a liquid crystal display or an organic electroluminescence (EL) display. The display unit 33 can display an image of a web page provided by the server apparatus 2 by processing based on the web browser program of the control unit 30. The display unit 33 is preferably a display with a built-in touch panel but may be a display without a built-in touch panel.

The operation unit 34 is a user interface, such as a keyboard and a pointing device, capable of input and output with the control unit 30 or a voice input unit. The touch panel of the display unit 33 or a physical button provided in the housing may be used for the operation unit 34. The operation unit 34 notifies the control unit 20 of the information of operation by the user.

As illustrated in FIG. 1, the network N includes a public communication network N1, which is the so-called Internet, and a carrier network N2 that realizes wireless communication according to a predetermined mobile communication standard. The public communication network N1 includes a general optical line, and the network N includes a dedicated line to which the server apparatus 2 is connected. The carrier network N2 includes a base station BS, and the client apparatus 3 can communicate with the server apparatus 2 from the base station BS via the network N. An access point AP is connected to the public communication network N1, and the client apparatus 3 can transmit and receive information to and from the server apparatus 2 via the network N from the access point AP.

In the monitoring system 100 configured as thus described, the server apparatus 2 acquires various pieces of information including the states of the power conditioner P, the energy storage module group L, the uninterruptible power system U, and the rectifier D periodically or in response to a request from the client apparatus 3 and stores the information into the storage unit 21. The storage unit 21 stores information for identifying an apparatus (P, U, D, M), from which information is acquired, and acquired time information in association with each other. The latest data stored in advance in the storage unit 21 and its history are processed by the server apparatus 2 so as to be able to be acquired as data (download) from the client apparatus 3 on a web page or acquired. The server apparatus 2 can comprehensively present, to the client apparatus 3, information acquired from the energy storage device or each power supply related apparatus by using the communication device 1.

Figure 4:
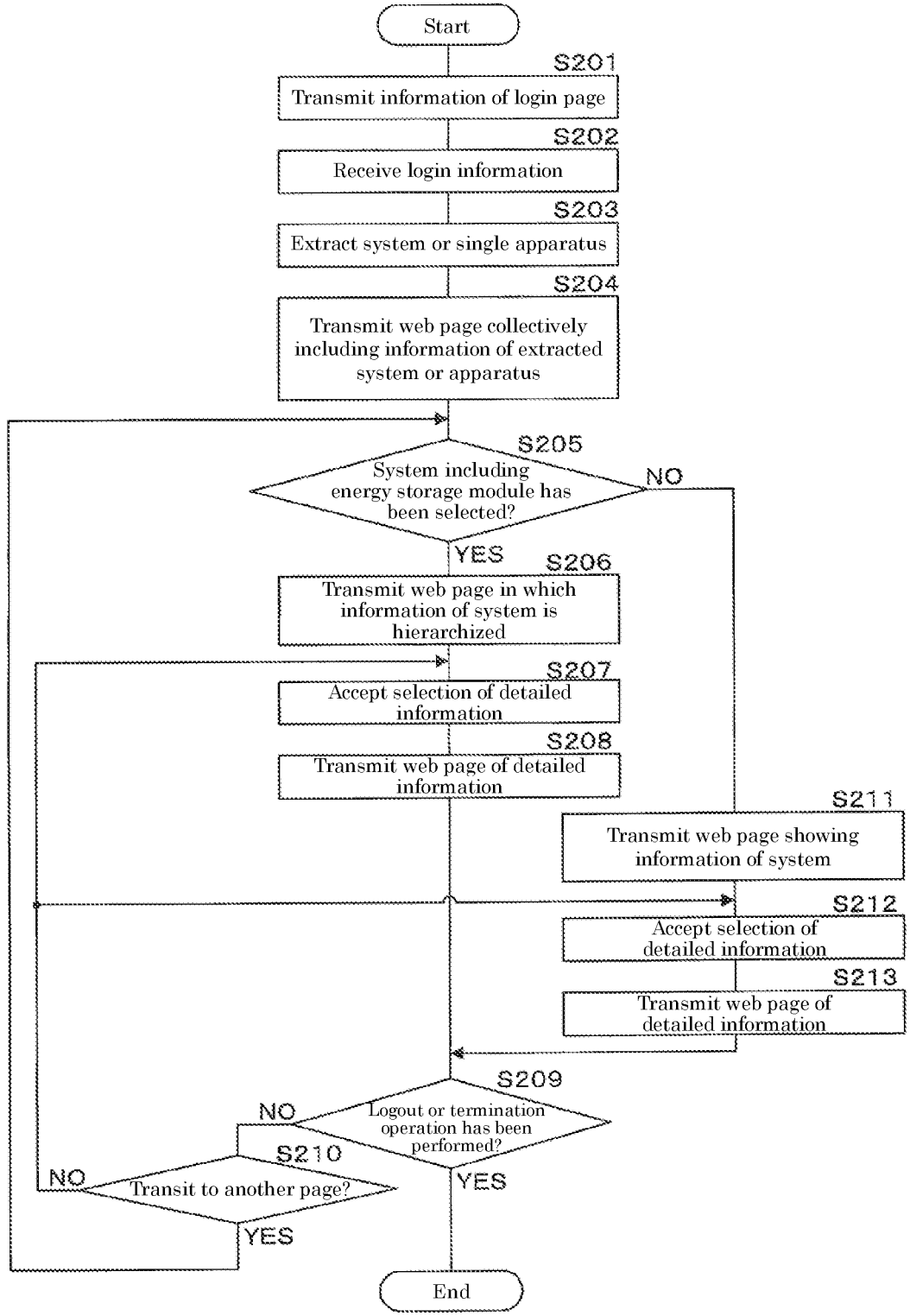
FIG. 4 is a flowchart illustrating an example of a processing procedure for information presentation in the server apparatus.

FIG. 4 is a flowchart illustrating an example of a processing procedure for information presentation in the server apparatus 2. The server apparatus 2 acquires information in the case of detecting an abnormality and information of a state at each time point from the control unit of each of the management apparatus M, the power conditioner P, the uninterruptible power system U, and the rectifier D disposed in the energy storage module group L via the communication device 1 that can be connected at a predetermined cycle and sequentially stores the information as data into the information storage unit 21. Then, upon receiving a login request from the client apparatus 3, the control unit 20 of the server apparatus 2 starts the following processing. At a regular timing or a timing when a change in the state of the system is detected, a notification for prompting login may be sent to the client apparatus 3 as an event, and the login page may be transmitted.

The control unit 20 transmits, as a web server, information of a login page for accepting login information in the client apparatus 3 to the client apparatus 3 (step S201). On the login screen displayed on the display unit 33 of the client apparatus 3, the control unit 20 receives login information on the basis of the operation in the operation unit 34 (step S202).

On the basis of the received login information, the control unit 20 extracts identification information of a system or a single apparatus having access authority stored in association with the login information (step S203). The control unit 20 transmits, to the client apparatus 3, information of a web page collectively including link information to another web page for displaying information of each system or apparatus corresponding to the extracted identification information (step S204). The list of the link information included in the web page transmitted at this time indicates the energy storage module group L, the power conditioner P, the uninterruptible power system U, and the rectifier D without distinction in units of systems (locations) using the energy storage module group L, the power conditioner P, the uninterruptible power system U, and the rectifier D. Thus, the operator (maintenance person) using the client apparatus 3 can collectively check the state of the energy storage module group L and the state of the uninterruptible power system U and the like. When there is one system or one single apparatus having an access authority associated with the login information, in step S204, information for displaying a web page for the one system or the one single apparatus is transmitted to the client apparatus 3 (S206 or S211).

The control unit 20 determines whether or not a link to the system including the energy storage module group L has been selected on the web page displayed on the client apparatus 3 on the basis of the information transmitted in step S204 (step S205). When determining that the link to the system including the energy storage module group L has been selected (S205: YES), the control unit 20 transmits a web page in which information of the system is hierarchized to the client apparatus 3 (step S206). The hierarchized web page is a page corresponding to the hierarchical structure of the energy storage module group L, and for example, the domain, the bank, and the energy storage module can be selected in this order, and the lower level can be selected in accordance with the selection. The hierarchical structure of each system is determined by a connection mode of an apparatus in which the communication device 1 is provided. These display examples will be described in detail in screen examples to be described later.

The control unit 20 accepts the selection of detailed information of the single energy storage module included in the system or the level corresponding to the management apparatus M in the web page of the information of the system including the energy storage module group L (step S207). When the detailed information is selected, the control unit 20 transmits a web page showing a state (configuration, total voltage, SOC, temperature, etc.) in the level as the detailed information to the client apparatus 3 (step S208). In step S208, as another detailed information, link information to the web server of the communication device 1 of the corresponding level may be transmitted to the client apparatus 3 (S208). As described above, it is possible to acquire, from the web server of the communication device 1, a web page presenting information that can be acquired in the apparatus mounted/connected with the communication device 1.

Thereafter, the control unit 20 determines whether or not a logout or web browser termination operation has been performed in the client apparatus 3 (step S209) and the control unit 20 terminates the processing when determining that the operation has been performed (S209: YES).

When determining that the logout or web browser termination operation has not been performed (S209: NO), the control unit 20 determines whether or not an instruction to transit to another page has been accepted (step S210). When determining that the instruction to transit to another page has been accepted (S210: YES), the control unit 20 returns the processing to step S205 and transmits a page or the like of another system in response to the operation from the web browser. When determining that the instruction to transit to another page has not been accepted (S210: NO), the control unit 20 returns the processing to step S207. While the selection of the detailed information is not accepted, the web page of the information of the system including the energy storage module group L remains displayed.

At this time, another page of the transition destination may include a link to a web page that is processed in association with each system and outputs stored log information, statistical information, and life prediction of the energy storage module included in the system. In addition, a management page such as editing of login information and editing of equipment included in the system may be included.

When determining in step S205 that the link to the system including the energy storage module group L has not been selected (S205: NO), the control unit 20 transmits, to the client apparatus 3, information of a web page for displaying information of the system using any one or more of the power conditioner P, the uninterruptible power system U, and the rectifier D (step S211).

The control unit 20 accepts the selection of detailed information on one or more of the power conditioner P, the uninterruptible power system U, and the rectifier D included in the selected system (step S212). The control unit 20 transmits a web page showing a state (parameters such as a configuration, a current value, and a voltage value) in the selected apparatus to the client apparatus 3 (step S213) and advances the processing to step S209. In step S213 as well, link information to the web server of the communication device 1 corresponding to the system or apparatus selected as another detailed information may be transmitted to the client apparatus 3 (S213). After the processing of step S213, when determining in step S210 that the instruction to transit to another page is not accepted (S210: NO), the control unit 20 returns the processing to step S212. While the selection of the detailed information is not accepted in step S212, the web page of the information of the selected system remains displayed.

The display processing of FIG. 4 will be specifically described using the screen examples illustrated in FIGS. 5 to 10. FIG. 5 is a diagram illustrating a screen example displayed after login. FIG. 5 illustrates a web screen 330 (a screen displayed on the display unit 33 of the client apparatus 3) including a list of names of systems or apparatuses extracted from the login information in step S204. In the example of FIG. 5, "XY-city mega solar system", which is the name of the mega solar power generating system S illustrated in FIG. 1, "WZ power plant system", which is the name of the thermal power generating system F, "K railway system", "X factory UPS", and the like are displayed as links together with identification information. In the web screen of the list, icons for outputting states (normal/abnormal) of each system at that time, graphs of measurement parameters in each system, and life prediction of an energy storage module used in the system are included for grasping the current state and analyzing information.

The web screen 330 displayed on the basis of the web page provided from the server apparatus 2 include menus 331 of "system search", "life prediction", "download", "report", and the like. When "system search" is selected among the menus 331, a page (FIG. 5) including a list of link information to each piece of information of the system or the single apparatus having the access authority is displayed. When "life prediction" is selected by the operation of the operation unit 34 of the client apparatus 3, a page for accepting the execution of the life prediction of the energy storage device in the selected system is displayed. When "download" is selected, a page for collectively acquiring the states of each equipment and the energy storage module group L included in the selected system as a file in a predetermined format is displayed. When "report" is selected, a page for acquiring the information of the server apparatus 2 itself and the information acquired by the server apparatus 2 in a document format is displayed. When "register" is selected, a page for accepting the new registration of login information and the new registration of the system including the energy storage module group L or the power supply related apparatus is displayed. When "edit" is selected, a page for accepting the editing of the login information already registered or the editing of the information of the system or apparatus already registered is displayed.

The web screen 330 includes a button 332 for the logout or termination operation.

Figure 6:
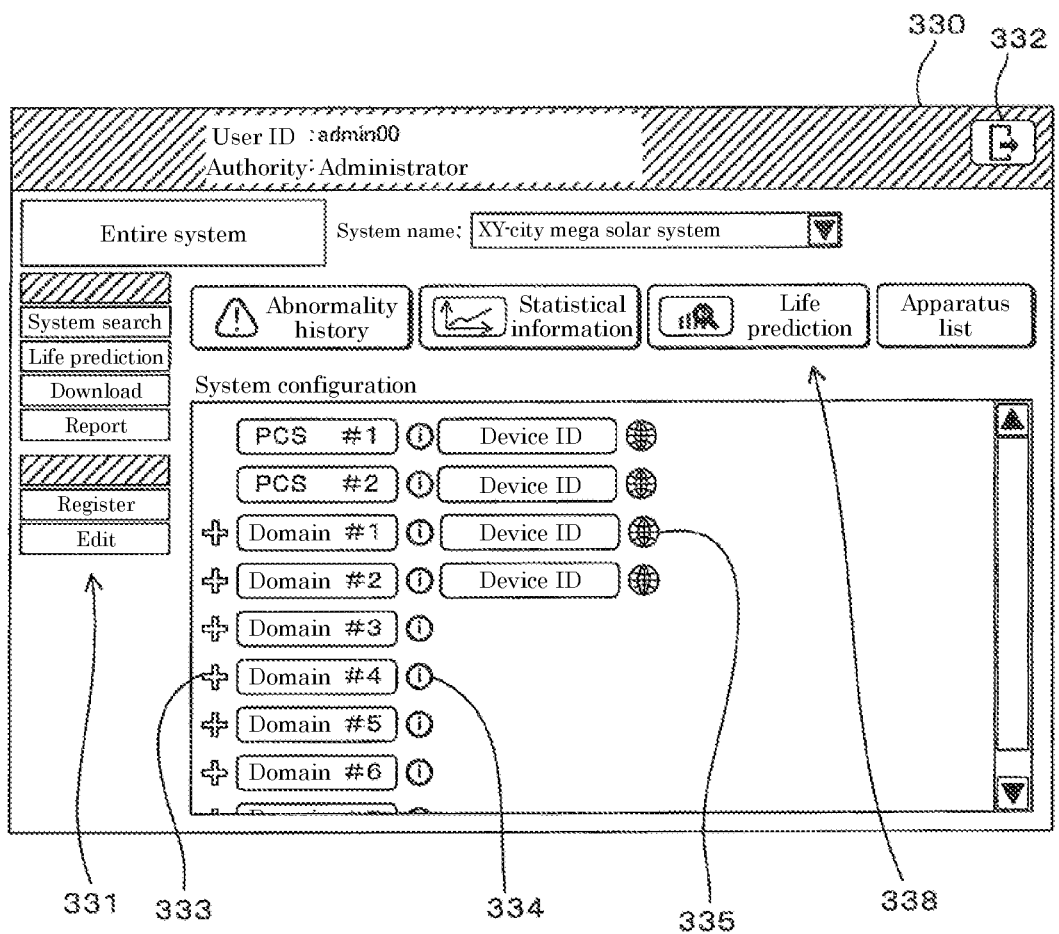
FIG. 6 is a view illustrating a screen example collectively displayed for each system.

Next, a screen example in a case where the system is selected will be described. FIG. 6 is a view illustrating a screen example on which the energy storage devices and the power supply related apparatuses are collectively displayed for each system. FIG. 6 illustrates a screen example displayed in step S206. Specifically, for example, the screen example is displayed on the display unit 33 when the "XY-city mega solar system" in which a large number of energy storage module groups L and the power conditioner P are used is selected on the web screen 330 illustrated in FIG. 5 by operating the operation unit 34 of the client apparatus 3. In the screen example of FIG. 6, the respective names of two power conditioners P and energy storage module groups L configured in a plurality of banks are illustrated in accordance with the system configuration of the energy storage system 101 used in the "XY-city mega solar system". For the energy storage module group L, a "+" icon 333 for expanding its hierarchical structure, an icon 334 for displaying detailed information of each energy storage module group L, and an icon 335 for displaying detailed information (real time) are disposed. The icon 335 is disposed with identification information of the device mounted with the communication device 1.

As illustrated in FIG. 6, the web screen 330 collectively displayed for each selected system includes a menu icon 338 for the selected system. The menu icon 338 includes, for example, menus of "abnormality history", "statistical information", "life prediction", and "apparatus list". When the menu icon of "abnormality history" is selected by the operation of the operation unit 34 of the client apparatus 3, abnormality or caution (warning) logs detected in the energy storage module groups L and the power supply related apparatuses included in the entire target system are displayed collectively. When "statistical information" is selected, graphs of statistical information (transition of voltage, current, temperature, and the like) for the entire target system are displayed collectively. When "life prediction" is selected, an interface for obtaining a result of life prediction for the entire system or each energy storage module group L included in the system is displayed. The "life prediction" will be described later in detail. When "apparatus list" is selected, a list of apparatuses is displayed for the power conditioner P included in the system, the energy storage module groups L, the management apparatuses M mounted in the energy storage module groups L, and the like. The list of apparatuses may include detailed information such as designations and model numbers.

It is preferable to identify a module to be subjected to a capacity measurement, which will be described later, while taking into account the information presented in this way.

As thus described, it is possible to collectively display the information of the energy storage module groups L and the power supply related apparatuses related to the energy storage module groups L included in the "XY-city mega solar system" and to display the state (detailed information) of each equipment while grasping the configuration from the page illustrated in FIG. 6.

Figure 7:
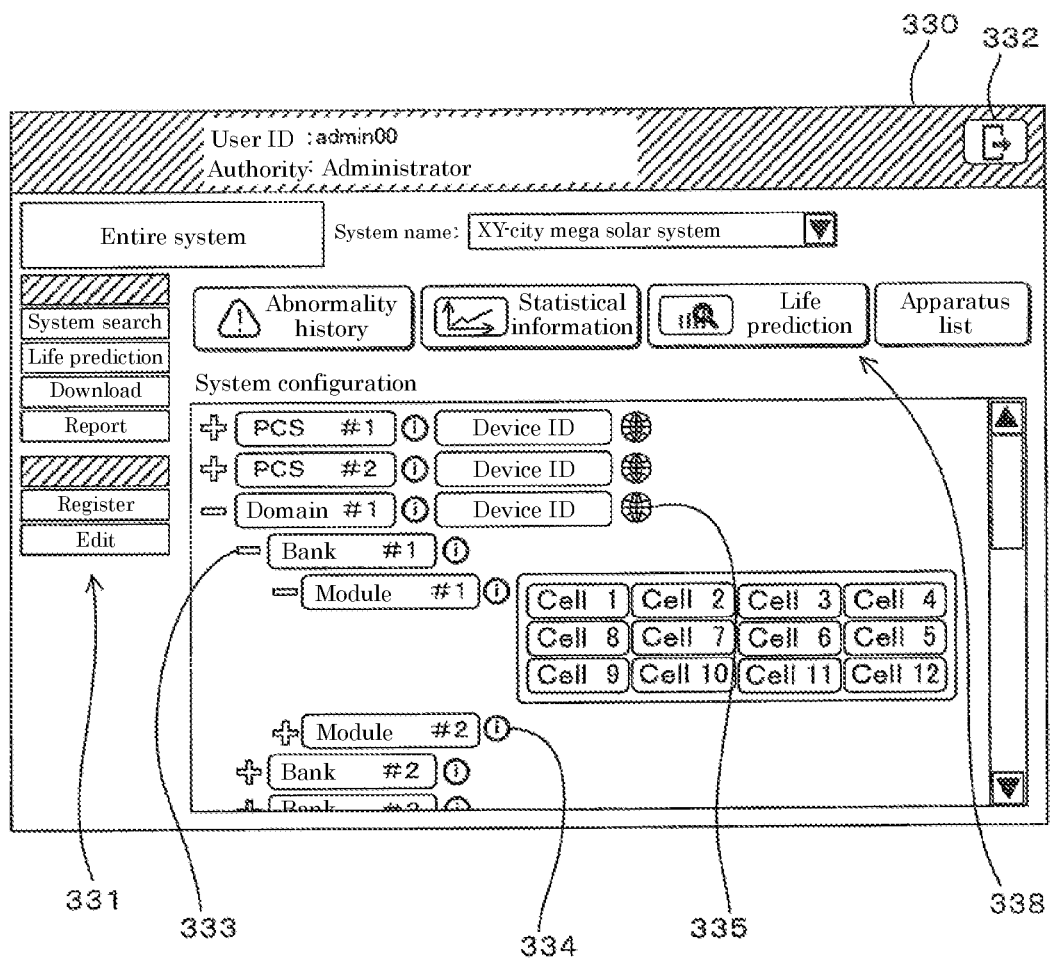
FIG. 7 is a view illustrating another screen example collectively displayed for each system.

FIG. 7 is a view illustrating another screen example on which the energy storage devices and the power supply related apparatuses are collectively displayed for each system. The screen example of FIG. 7 is displayed when the icon 333 for displaying detailed information on the energy storage module group L in FIG. 6 is selected. The energy storage system 101 of the "XY-city mega solar system" has an energy storage module group L configured to have a plurality of domains each having a plurality of banks in which a plurality of modules each including n cells (n is a natural number and is 12 in the present embodiment) are arranged in series. Accordingly, as illustrated in FIG. 7, when one of the domains is selected, a list corresponding to a bank belonging to the domain is expanded, and when one bank is selected, a list of energy storage modules belonging to the bank is expanded. Each energy storage module includes n cells, and when one of the energy storage modules is selected on the screen 330 by the operation of the operation unit 34 of the client apparatus 3, a list (image) of the cells included in the module is developed.

Among the patterns of the plurality of modules belonging to a certain bank illustrated in FIG. 7, the pattern of the module including the cell with the lowest voltage value in the bank may be displayed in a different color or may be inverted. On the basis of this information, the maintenance person can identify a module to be subjected to the capacity measurement.

Among the patterns of the plurality of cells belonging to a certain module illustrated in FIG. 7, the pattern of the cell with the lowest voltage value in the bank may be displayed in a different color or may be inverted.

In the example in which the development of the hierarchical structure of the energy storage module group L in FIG. 7 is displayed, the icon 335 is disposed only in the level (in FIG. 7, the domain) corresponding to the management apparatus M mounted/connected with the communication device 1. The placement of the icon 335 is not limited to the example of FIG. 7. When the communication device 1 is connected in a hierarchical structure for each bank, the icon 335 may be arranged corresponding to each bank.

Figure 8:
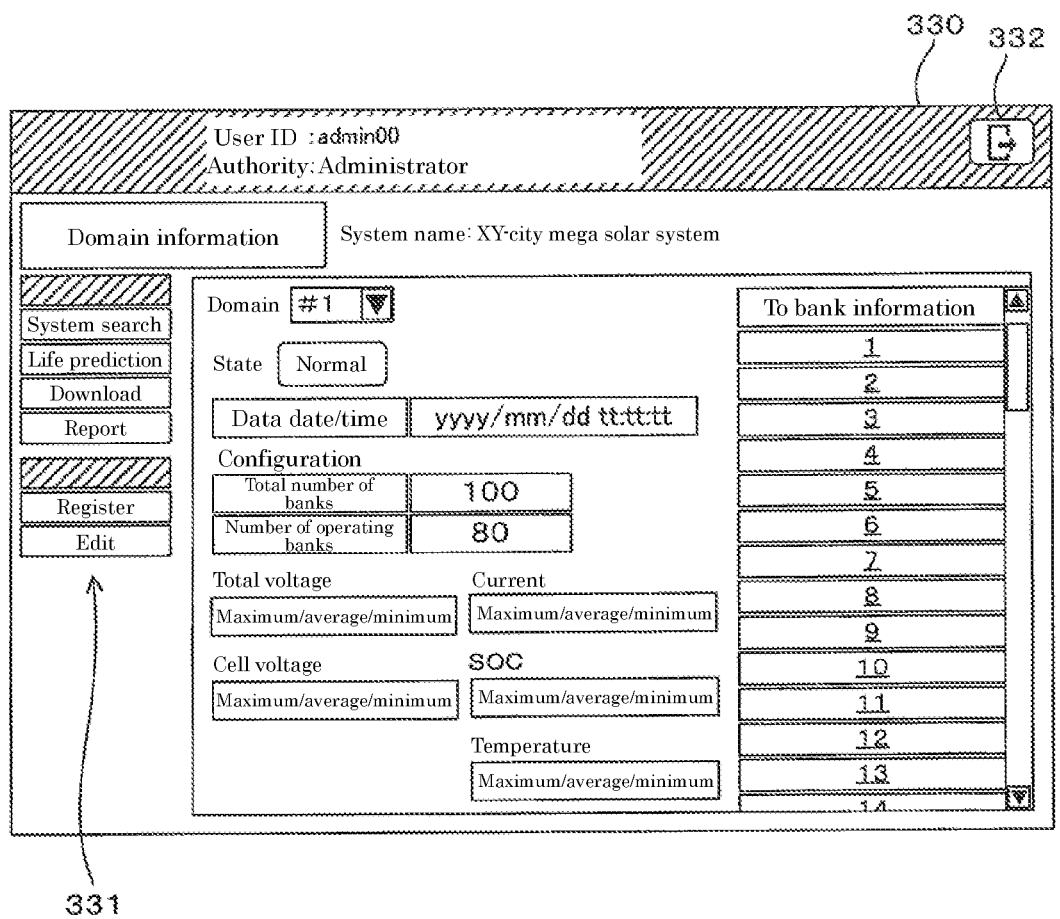
FIG. 8 is a view illustrating a display example of detailed information.

FIG. 8 is a view illustrating a display example of detailed information. FIG. 8 is an example of a page displayed when the icon 334 on the level corresponding to the domain of the energy storage module group L in FIG. 7 is selected. In FIG. 8, the state (normal/abnormal) of the domain, the number of banks (total number of banks) included in the domain, the number of banks operating in all the banks (number of operating banks), and the distributions (maximum values, average values, and minimum values) of the total voltage, the current, the cell voltage, the SOC, and the temperature of the domain are displayed as "domain information". A "data date/time" at which the "domain information" is acquired by the server apparatus 2 via the communication device 1 is also displayed on the web screen 330 of the display unit 33. The "domain information" includes links to the pieces of detailed information of the banks included in the domain for the number of banks.

Figure 9:
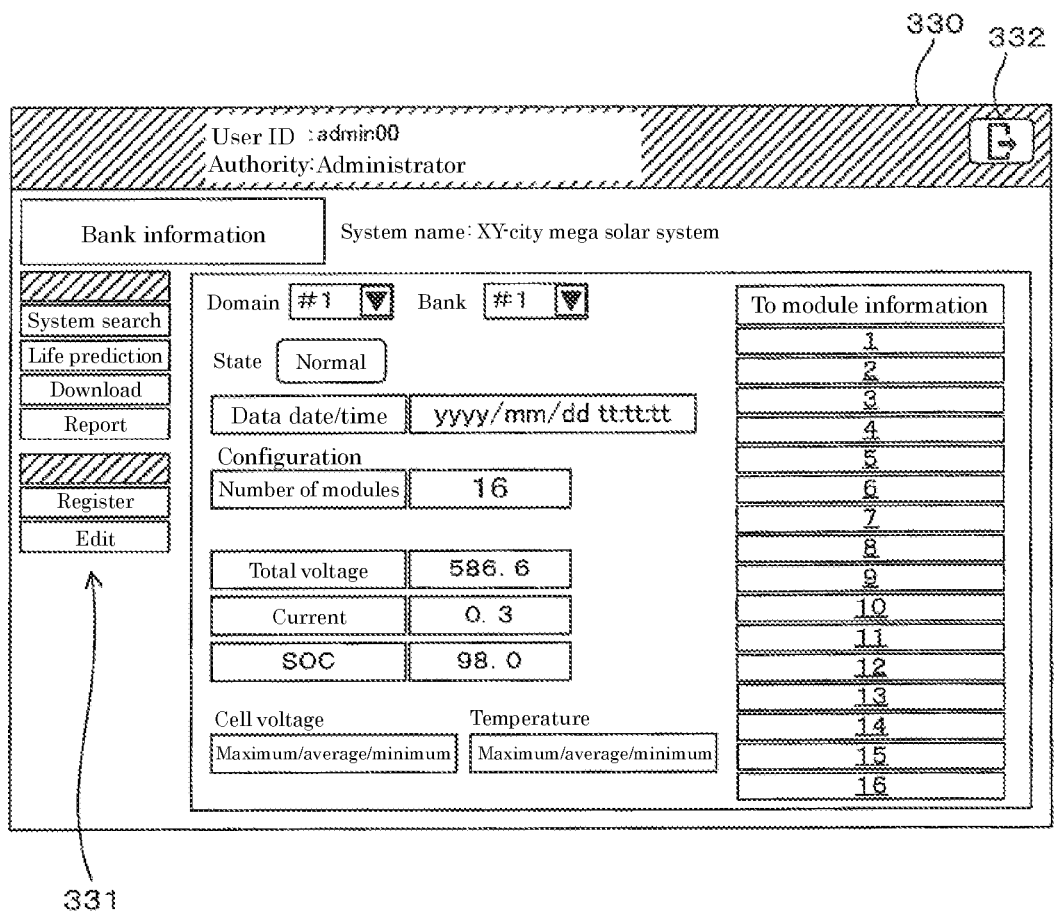
FIG. 9 is a view illustrating a display example of detailed information.

FIG. 9 is a view illustrating a display example of detailed information. FIG. 9 is an example of a page displayed when the icon 334 in the level corresponding to the bank in FIG. 7 is selected. This page is also displayed when the link to the detailed information of the bank is selected in FIG. 8. In FIG. 9, the state (normal/abnormal) of the bank, the number of modules included in the bank (the number of modules), the total voltage, the current value, and the SOC of the bank, the voltage of the cell included in the bank, and the distribution of the temperature are displayed as "bank information". A "data date/time" at which the "bank information" is acquired by the server apparatus 2 via the communication device 1 is also displayed on the web screen 330 of the display unit 33. The "bank information" includes links to pieces of detailed information of the energy storage modules included in the bank for the number of modules.

Among the links to the pieces of detailed information of the modules illustrated in FIG. 9, the link to the module including the cell with the lowest voltage value in the bank may be displayed in a different color or may be inverted.

Figure 10:
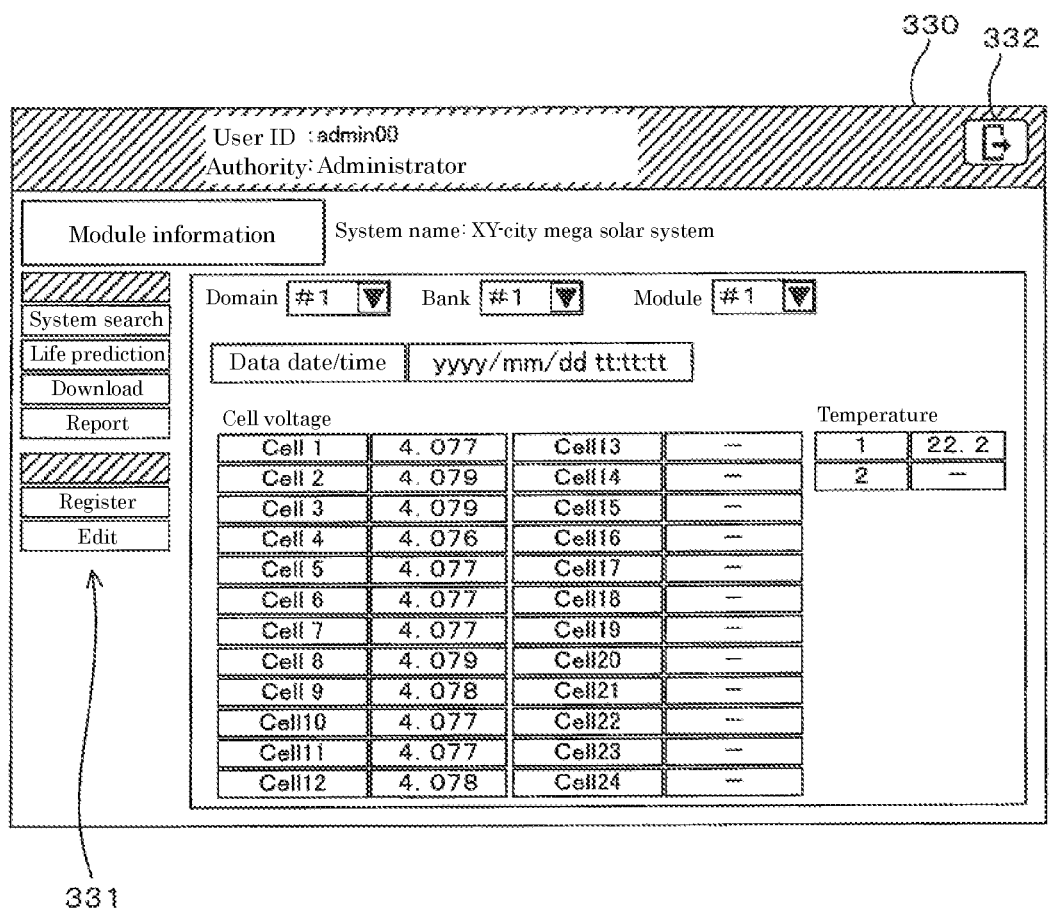
FIG. 10 is a view illustrating a display example of detailed information.

FIG. 10 is a view illustrating a display example of detailed information. FIG. 10 is an example of a page displayed when the icon 334 in the level corresponding to the module in FIG. 7 is selected. In FIG. 9, this page is displayed when the link to the detailed information of the module is selected by the operation of the operation unit 34 of the client apparatus 3. In FIG. 10, the voltage of each cell included in the energy storage module and the output of a temperature sensor provided in each of two cell groups are displayed as "module information".

Among the patterns of a plurality of cells illustrated in FIG. 10, the pattern of the cell with the lowest voltage value in the bank may be displayed in a different color or may be inverted.

The screen of the page for each level of the energy storage module group L displayed in each of FIGS. 7 to 10 is an example. When there is no domain information and the energy storage module group L includes a plurality of parallel banks, the top level is displayed as a bank. When the energy storage module group L includes only one bank, that is, for example, 16 energy storage modules connected in series, only module information (FIG. 9) obtained from the corresponding communication device 1 is displayed.

Second Embodiment

Figure 11:
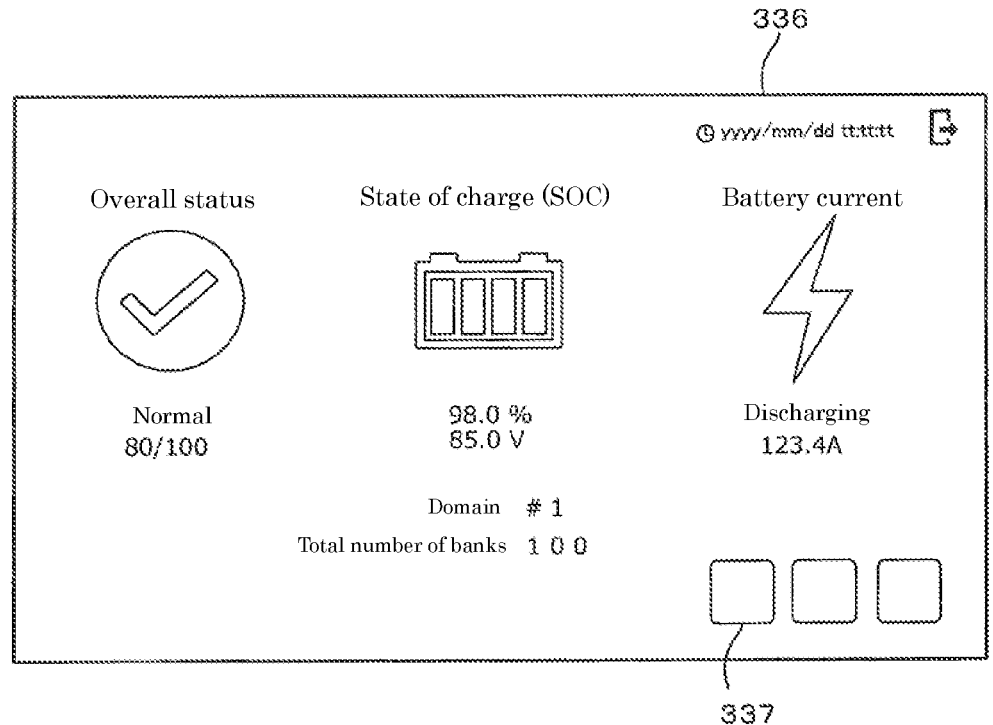
FIG. 11 is a view illustrating an example of a web screen presented from a communication device.

FIG. 11 is a view illustrating an example of a web screen presented from a communication device. FIG. 11 is a screen displayed when the icon 335 in the level corresponding to the domain in FIG. 6 is selected, and illustrates an example of a web screen 336 provided by the web server of the communication device 1 mounted in/connected to the management apparatus M illustrated in FIG. 3. Displaying the web screen 336 illustrated in FIG. 11 requires logging in to the web server of the communication device 1. It is preferable to make the login information at this time common to the login to the web server provided by the server apparatus 2 of FIG. 5 so that logging in is automatically performed without an operation for inputting the login information again, and the page of FIG. 11 is displayed.

In the example illustrated in FIG. 11, the communication device 1 directly provides information, obtained from the control board mounted in each energy storage module via the management apparatus M provided in each bank belonging to the domain, to the client apparatus 3 through the web screen 336. For example, when an abnormality has been detected, the content or abnormal point of the abnormality is displayed by character information (error code) or an image such as color, animation, or a schematic diagram. The information provided by the web screen 336 from the communication device 1 is basically the latest information at that time and is distinguished from the data stored in the storage unit 21 of the server apparatus 2.

The web screen 336 displayed by the function of the web server of the communication device 1 preferably includes a plurality of menu icons 337 for executing processing on the management apparatus M or the control board via the communication device 1. The plurality of menu icons 337 include, for example, a menu for displaying various types of information including information of abnormality as described above obtained via the communication device 1, a menu for settings of a time, a mail address for notification, and the like in the communication device 1, or for restart (shutdown). The menu icon 337 may include a setting menu for a remote operation limited to those having the authority of the maintenance person and a setting menu for a log interval and the like.

The content displayed on the web screen 336 can also be changed in accordance with the level of the energy storage module group L. As illustrated in FIG. 11, the web screen 336 provided from the communication device 1 connected to the management apparatus M corresponding to the domain level and displayed on the display unit 33 includes an item of "overall status". In the present embodiment, "overall status" indicates whether or not the number of normally operating banks is equal to or more than a predetermined ratio with respect to the total number of banks included in the domain. The web screen 336 provided from the communication device 1 connected to the management apparatus M corresponding to the bank level does not include the item of "overall status". As for "state of charge (SOC)", on the web screen 336 provided from the communication device 1 corresponding to the level of the domain, the average value of the amounts of charge of the plurality of banks included in the domain is displayed On the web screen 336 provided from the communication device 1 corresponding to the level of the bank, the amount of charge of the bank is indicated. As for "battery current", on the web screen 336 provided from the communication device 1 corresponding to the level of the domain, character information showing the total current amount from the plurality of banks included in the domain is displayed On the web screen 336 provided from the communication device 1 corresponding to the bank level, character information showing the amount of current from the bank is displayed.

In the communication device 1, on the basis of the stored screen data, the web screen 336 is transitioned in accordance with the selection operations of various icons by the operation unit 34 of the client apparatus 3. A display screen for detailed information, an input screen for setting, and the like are displayed in accordance with the selection of the menu.

Figure 12:
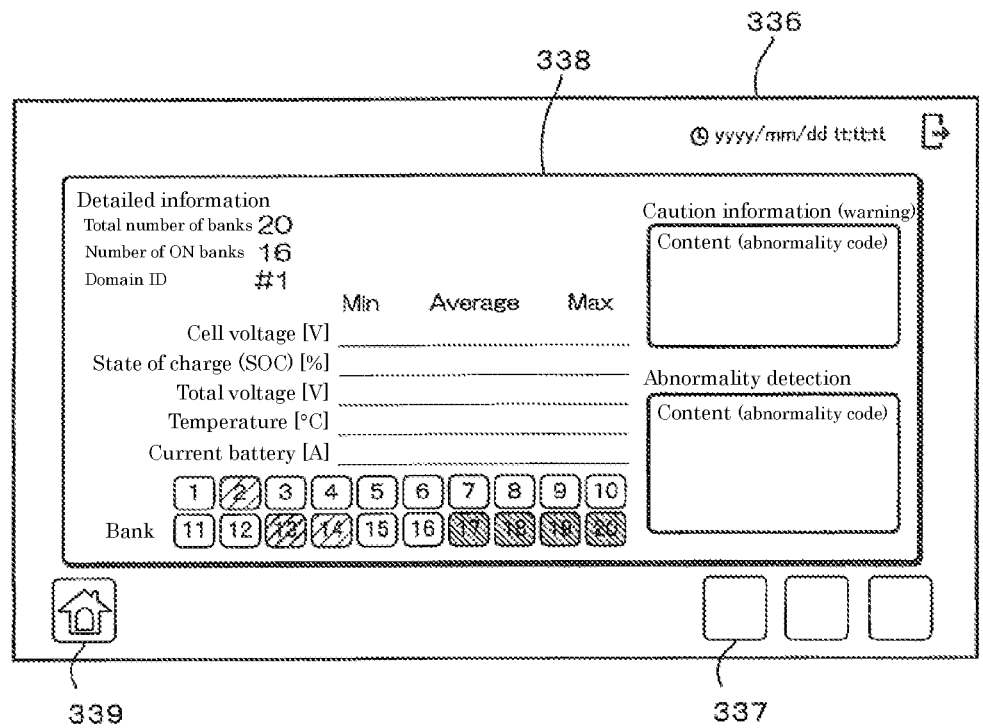
FIG. 12 is a view illustrating an example of a web screen presented from a communication device.

FIG. 12 is a screen example displayed when an icon for displaying detailed information is selected from the menu icons 337 of FIG. 11. As illustrated in FIG. 12, a screen 338 is displayed by an effect superimposed on the web screen 336, and an icon 339 for returning to the web screen 336 of FIG. 11 is displayed. On the screen 338, real-time detailed information of the domain corresponding to the management apparatus M to which the communication device 1 is connected is displayed as detailed information. The detailed information displays, for example, the number of banks included in the domain (the total number of banks), the number of banks operating in all the banks (the number of ON banks), and the minimum values, the average values, and the maximum values of the cell voltage, the SOC, the total voltage, the temperature, and the current of the domain. In the detailed information, when caution information or an abnormality detection result is output by the self-diagnosis function of the control board of each management apparatus M or module, a message showing content and a corresponding abnormality code are preferably displayed. On the screen 338 of the detailed information, the state in the level of the bank below the level of the domain is represented by a pattern attached with identification information such as the number of each bank. The state may be distinguished and displayed by color, brightness, or pattern. In the example of FIG. 12, the banks #17 to #20 are not operating, and hence the banks are displayed in gray, for example. When a pattern corresponding to each bank is selected on the screen 338 by the operation unit 34, a link is provided, and the display is switched to the detailed information of the bank in the screen 338. The screen displaying the information of the bank may include a link to detailed information of each energy storage module.

Among the bank patterns illustrated in FIG. 12, the bank pattern including the cell with the low voltage value may be displayed in a different color or may be inverted. When a pattern of a bank is selected, patterns of a plurality of modules belonging to the bank are displayed, and among the patterns, the pattern of a module including the cell with the lowest voltage value in the bank is displayed in a different color or is inverted.

Since the information provided by the web screen 336 from the communication device 1 is newer than the information provided by the web screen 330 from the server apparatus 2, the maintenance person can identify a module to be subjected to the capacity measurement on the basis of the latest information.

Figure 13:
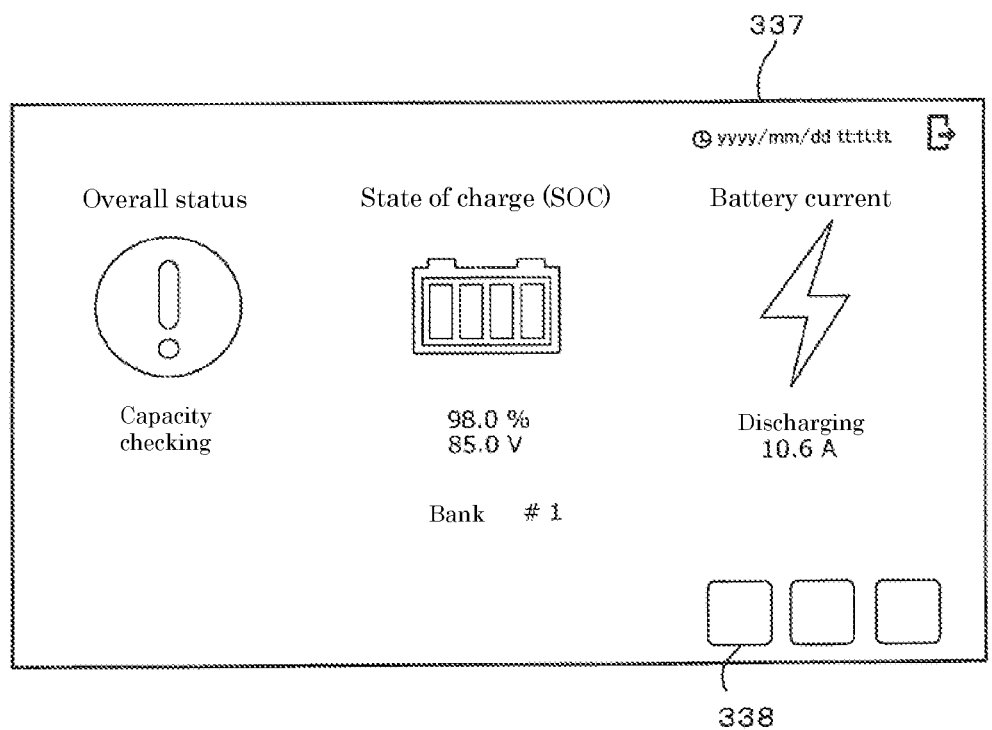
FIG. 13 is a view illustrating an example of a web screen presented from a communication device.

During the work of the capacity measurement (capacity checking) in a specific bank, a web screen 337 illustrated in FIG. 13 may be displayed by the function of the web server of the communication device 1. As the state of the bank, a message showing "capacity checking" is included.

In the work of the capacity measurement, the switching unit 41 in a specific bank may be opened (tripped), and a load for measurement may be connected, and the module or the cell may be discharged at a predetermined discharge rate (e.g., 1 C rate). During this period, by displaying the web screen 337 illustrated in FIG. 13 by the function of the web server of the communication device 1, when the user or another maintenance person tries to know the state of the bank, it can be understood that the capacity is being measured (it can be understood that the switching unit 41 is not opened due to an abnormality occurring in the bank).

The present invention is not limited to the embodiments described above. For example, the present invention may have the following configurations:

First Modification Example

A maintenance method for an energy storage system, the method including:
  measuring, by a voltage sensor, a voltage value of each of a plurality of energy storage cells except for lithium ion batteries in an energy storage system including a bank in which a plurality of modules, each formed by connecting the plurality of lithium ion battery cells, are connected in series;
  identifying a module that includes a cell with the lowest voltage value in the bank; and
  performing a capacity measurement on the identified module or the cell with the lowest voltage value.

Second Modification Example

A maintenance method for an energy storage system, the method including:
  measuring, by a voltage sensor, a voltage value of each of a plurality of energy storage cells in an energy storage system including a bank in which a plurality of modules, each formed by connecting the plurality of lithium ion battery cells, are connected in series;
  identifying a module that includes a cell with the lowest voltage value in the bank remotely (e.g., via a network including a public communication network); and
  performing a capacity measurement on the identified module or the cell with the lowest voltage value remotely by a communication terminal apparatus (e.g., personal computer, smartphone, or tablet-type communication terminal apparatus).

Third Modification Example

A maintenance method for an energy storage system, the method including:
  measuring, by a voltage sensor, a voltage value of each of a plurality of energy storage cells in an energy storage system including a bank in which a plurality of modules, each formed by connecting the plurality of lithium ion battery cells, are connected in series;
  a local storage unit, provided in the energy storage system, storing the voltage values as log data;
  reading the voltage log data stored in the storage unit and identifying a module that includes a cell with the lowest voltage value in the bank; and
  performing a capacity measurement on the identified module or the cell with the lowest voltage value

The invention claimed is:
1. A maintenance method for an energy storage system, the method comprising:
  measuring, by a voltage sensor, a voltage value of each of a plurality of lithium ion battery cells in an energy storage system including a bank, wherein the bank includes a plurality of modules connected in series, and wherein each of the plurality of modules includes the plurality of lithium ion battery cells connected in series;
  identifying a module that includes a cell with a lowest voltage value in the bank;
  extracting the identified module from the bank; and
  after the extracting, performing a full-charge capacity measurement on the identified module or the cell with the lowest voltage value, wherein the performance of the full-charge capacity measurement involves an opening of a switching unit in a bank in which the identified module or cell is located, applying an external load to the identified module or cell therein, and discharging the identified module or cell at a predetermined discharge rate.

2. The maintenance method for the energy storage system according to claim 1, wherein the identifying is performed by identifying a module that includes a cell with the lowest voltage value in the bank from a voltage value of each of the cells in the bank during charge or discharge.

3. The maintenance method for the energy storage system according to claim 2, wherein the identifying is performed by identifying a module that includes a cell with the lowest voltage value in the bank from a voltage value of each of the cells in a state of charge close to complete discharge or a use lower limit.

4. The maintenance method for the energy storage system according to claim 1, wherein the identifying is performed by identifying a module that includes a cell with the lowest voltage value in the bank from a voltage value of each of the cells in a state of charge close to complete discharge or a use lower limit.

5. The maintenance method for the energy storage system according to claim 2, wherein the identifying is performed by identifying a module that includes a cell with the lowest voltage value in the bank from history data of voltage values stored in a storage unit.

6. The maintenance method for the energy storage system according to claim 3, wherein the identifying is performed by identifying a module that includes a cell with the lowest voltage value in the bank from history data of voltage values stored in a storage unit.

7. The maintenance method for the energy storage system according to claim 1, the method further comprising:
   causing a computer to communicably connect to a communication device provided in the energy storage system or an information processing apparatus acquiring information that includes a state of the energy storage system from the communication device by communication; and
   causing the computer to receive screen display information for the identification from the communication device to identify a module that includes a cell with the lowest voltage value in the bank.

8. The maintenance method for the energy storage system according to claim 1, wherein the full-charge capacity is an amount of charge dischargeable from the fully charged identified module or the cell with the lowest voltage value.

9. A computer program product comprising at least one non-transitory computer-readable storage medium having computer-readable program code portions stored therein, the computer-readable program code portions being configured for causing a computer to execute the steps of:
   requesting communication connection to a communication device provided in an energy storage system or an information processing apparatus acquiring information that includes a state of the energy storage system from the communication device by communication;
   displaying information for identifying a module that includes a cell with a lowest voltage value in a bank of the energy storage system on a basis of screen display information transmitted in response to the request, wherein the module is one of a plurality of modules connected in series in the bank, wherein each of the plurality of modules includes a plurality of lithium ion battery cells connected in series;
   extracting the identified module from the bank; and
   post-extraction, performing a full-charge capacity measurement on the identified module or the cell with the lowest voltage value, wherein the performance of the full-charge capacity measurement involves an opening of a switching unit in a bank in which the identified module or cell is located, applying an external load to the identified module or cell therein, and discharging the identified module or cell at a predetermined discharge rate.

10. The computer program product according to claim 9, wherein the full-charge capacity is an amount of charge dischargeable from the fully charged identified module or the cell with the lowest voltage value.

11. A maintenance method for an energy storage system, which includes a bank having a plurality of modules connected in series, with each of the plurality of modules including a plurality of lithium ion battery cells likewise connected in series, the method comprising:
   causing a computer to communicably connect to a communication device, which is a first web server and is provided in the energy storage system, or an information processing apparatus, which is a second web server and acquires information containing a state of the energy storage system from the communication device by communication;
   causing the computer to receive screen display information to display a screen for identifying a module that includes a cell with a lowest voltage value in the bank;
   extract the identified module from the bank; and
   post-extraction, performing a full-charge capacity measurement on the identified module or the cell with the lowest voltage value, wherein the performance of the full-charge capacity measurement involves an opening of a switching unit in a bank in which the identified module or cell is located, applying an external load to the identified module or cell therein, and discharging the identified module or cell at a predetermined discharge rate.

12. The maintenance method for the energy storage system according to claim 11, wherein the full-charge capacity is an amount of charge dischargeable from the fully charged identified module or the cell with the lowest voltage value.

13. A maintenance method for an energy storage system that stores renewable energy or electric power generated in existing power generating systems, the method comprising:
   measuring, by a voltage sensor, a voltage value of each of a plurality of lithium ion battery cells in an energy storage system including a bank that includes a plurality of modules connected in series and each including a plurality of lithium ion battery cells connected in series;
   identifying a module that includes a cell with a lowest voltage value in the bank; and
   performing a full-charge capacity measurement on the identified module or the cell with the lowest voltage value, wherein the performance of the full-charge capacity measurement involves an opening of a switching unit in a bank in which the identified module or cell is located, applying an external load to the identified module or cell therein, and discharging the identified module or cell at a predetermined discharge rate.

14. The maintenance method for the energy storage system according to claim 13, wherein the full-charge capacity is an amount of charge dischargeable from the fully charged identified module or the cell with the lowest voltage value.

15. The maintenance method for the energy storage system according to claim 13, further comprising the step of extracting the module from the bank prior to the performing of the full-charge capacity measurement.

16. The maintenance method for the energy storage system according to claim 13, wherein the identifying is performed by identifying a module that includes a cell with the lowest voltage value in the bank from a voltage value of each of the cells in the bank during charge or discharge.

17. The maintenance method for the energy storage system according to claim 16, wherein the identifying is performed by identifying a module that includes a cell with the lowest voltage value in the bank from a voltage value of each of the cells in a state of charge close to complete discharge or a use lower limit.

18. The maintenance method for the energy storage system according to claim 13, wherein the identifying is performed by identifying a module that includes a cell with the lowest voltage value in the bank from a voltage value of each of the cells in a state of charge close to complete discharge or a use lower limit.

19. The maintenance method for the energy storage system according to claim 16, wherein the identifying is performed by identifying a module that includes a cell with the lowest voltage value in the bank from history data of voltage values stored in a storage unit.

20. The maintenance method for the energy storage system according to claim 17, wherein the identifying is performed by identifying a module that includes a cell with the lowest voltage value in the bank from history data of voltage values stored in a storage unit.

* * * * *